(12) United States Patent
Allen

(10) Patent No.: US 7,430,775 B2
(45) Date of Patent: Oct. 7, 2008

(54) VEHICLE RAMP

(75) Inventor: Richard D. Allen, Fairbury, NE (US)

(73) Assignee: Prairie View Industries, Inc., Fairbury, NE (US)

( * ) Notice: Subject to any disclaimer, the term of this patent is extended or adjusted under 35 U.S.C. 154(b) by 889 days.

(21) Appl. No.: 10/318,425

(22) Filed: Dec. 13, 2002

(65) Prior Publication Data

US 2004/0111814 A1 Jun. 17, 2004

(51) Int. Cl.
*E01D 1/00* (2006.01)

(52) U.S. Cl. ...................................................... 14/69.5

(58) Field of Classification Search ................ 14/69.5; D34/32; 254/88; 182/20, 215, 228.1; 29/897.15, 29/897.31, 897.312; 5/23, 236.1, 238
See application file for complete search history.

(56) References Cited

U.S. PATENT DOCUMENTS

| | | | | | |
|---|---|---|---|---|---|
| 106,996 | A | * | 9/1870 | Cannon et al. | 182/104 |
| 285,605 | A | * | 9/1883 | Flora | 182/215 |
| D35,000 | S | * | 8/1901 | Kendrick | D6/503 |
| 726,046 | A | * | 4/1903 | Grabs | 5/238 |
| 984,823 | A | * | 2/1911 | Linden | 5/279.1 |
| 1,279,944 | A | * | 9/1918 | Tolman | 5/93.1 |
| 1,319,576 | A | * | 10/1919 | Durden | 5/183 |
| 1,445,573 | A | * | 2/1923 | Wilford | 182/194 |
| 1,846,567 | A | * | 2/1932 | Murray, Jr. | 280/796 |
| 1,926,885 | A | * | 9/1933 | Rich | 182/217 |
| 1,977,299 | A | * | 10/1934 | Bates | 29/897.15 |
| 2,113,403 | A | * | 4/1938 | Harmon | 280/796 |
| 2,274,125 | A | * | 2/1942 | Carney | 211/153 |
| 2,350,875 | A | * | 6/1944 | Carney | 29/897.15 |
| 3,224,081 | A | * | 12/1965 | Richter | 29/897.15 |
| 4,024,929 | A | * | 5/1977 | Mintz | 182/151 |
| 4,508,321 | A | * | 4/1985 | Morimoto | 256/65.09 |
| 4,627,200 | A | * | 12/1986 | Lapeyre | 52/191 |
| 5,134,732 | A | * | 8/1992 | Li | 5/93.1 |
| 5,156,234 | A | * | 10/1992 | McCallum et al. | 182/46 |
| 5,201,085 | A | * | 4/1993 | Shamie | 5/93.1 |
| 5,211,260 | A | | 5/1993 | Toycen | |
| 5,547,041 | A | | 8/1996 | Morral Gispert | |
| 5,938,397 | A | * | 8/1999 | Schouest | 414/537 |
| 6,032,759 | A | * | 3/2000 | Yeh | 182/228.1 |
| 6,139,249 | A | * | 10/2000 | Lucht | 414/537 |
| 6,526,706 | B1 | * | 3/2003 | Fowler | 52/182 |

OTHER PUBLICATIONS

In re Karlson (CCPA) 136 USPQ 184, 1963.*

* cited by examiner

*Primary Examiner*—Gary S Hartmann
(74) *Attorney, Agent, or Firm*—Stinson Morrison Hecker LLP

(57) ABSTRACT

A vehicle ramp comprising two outer side rails, a plurality of rungs configured to extend between the side rails, and at least one connecting member configured to releasably secure the side rails in place with the rungs therebetween. A plurality of slots in each side rail are configured to receive opposing ends of the rungs and to hold the same in place when the side rails are secured together by the connecting member.

1 Claim, 4 Drawing Sheets

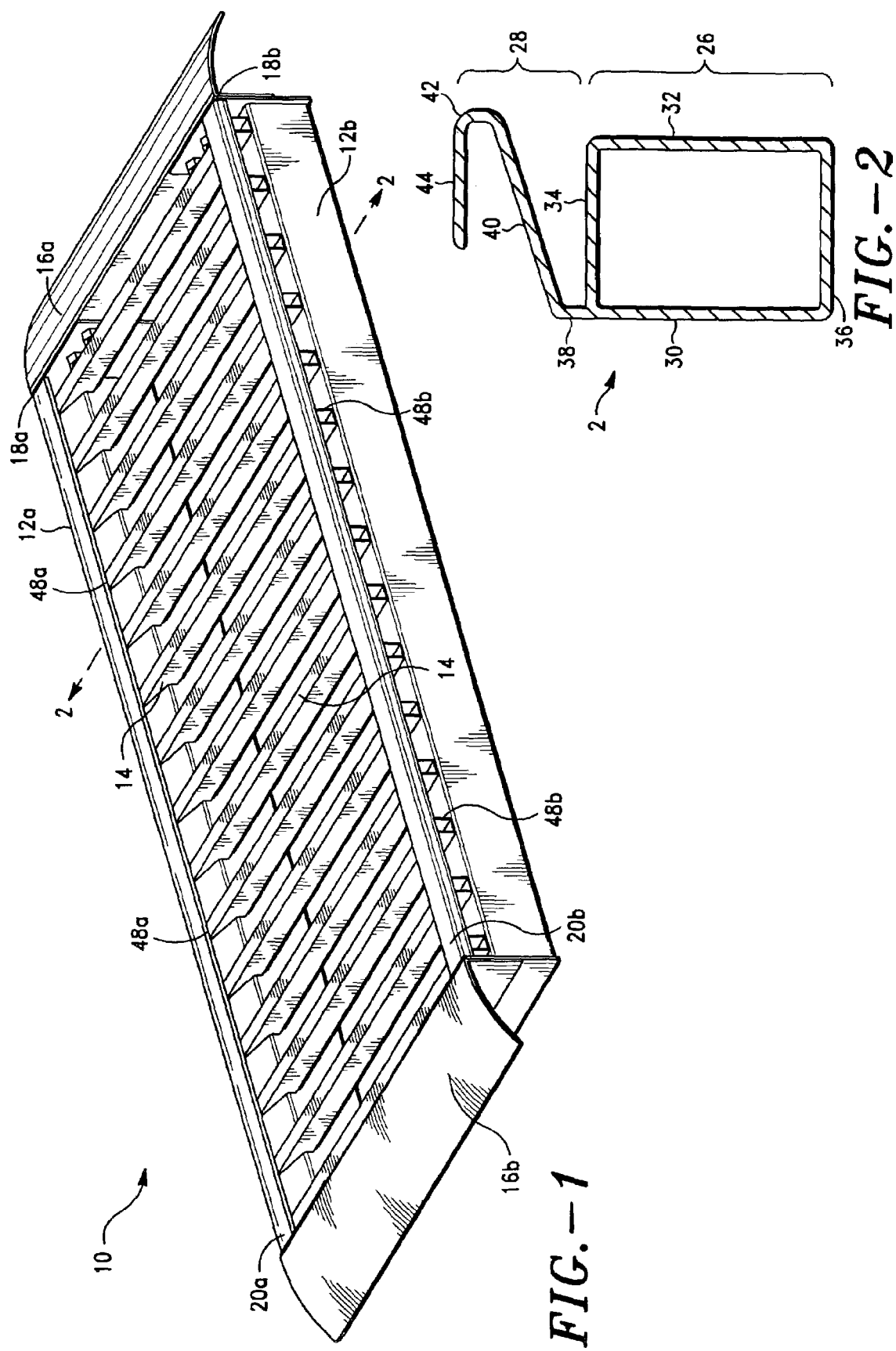

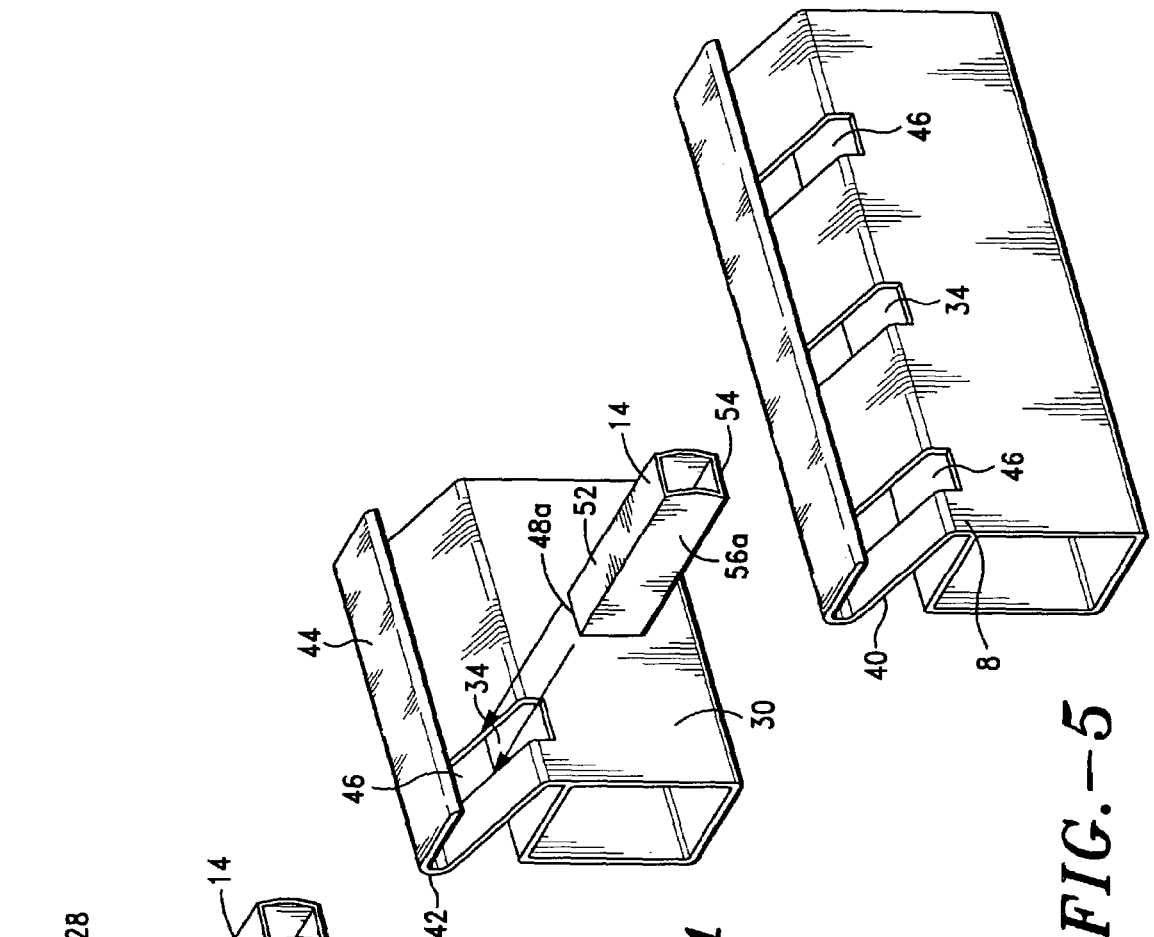

VEHICLE RAMP

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to the field of loading ramps, and is more specifically directed to a vehicle loading ramp that is inexpensive to manufacture, easily assembled, lightweight, compactly storable, and readily repairable.

2. Description of Related Art

Loading ramps are commonly used to facilitate moving, loading, and transporting a wide variety of items from one elevation to another. Of particular interest, vehicle loading ramps are known and used to load vehicles such as motorcycles, lawnmowers, and all-terrain vehicles ("ATVs") for transport to other locations. For example, ATV users often have to transport their vehicles to areas where the ATVs can be used. This typically requires loading the ATV onto a trailer, truck, or other transport to haul the ATV to a location where it is unloaded. Loading and unloading the ATV usually requires the use of vehicle ramps whereby the ATV can be driven on and off the transport.

Vehicle ramps are commonly made of metal comprising ladder-like rungs extending between side rails. These ladder-like ramps are believed to provide better traction than ramps having a solid surface. Conventional manufacture of a ladder-like ramp requires that the rungs be positioned on the side rails, clamped or held in position, and then welded or bolted into place. In addition to being expensive to manufacture, the resulting assembled ramp is bulky, and difficult to package, ship and store.

A further problem with conventional ladder-like ramps arises when one of the ramp components is broken or damaged. It is virtually impossible to repair or replace a broken component of a welded ramp without the use of welding equipment. Thus, a broken or damaged ramp component may render the ramp unusable until it can be taken or shipped to a location where such repair equipment is available. The damage may prevent loading or unloading the ATV from the transport vehicle, and thus strand the ATV until repairs can be completed. Even if the ramp components are not welded, but are removably fastened, the large number of fasteners required makes removing and replacing the damaged component a tedious and labor-intensive undertaking.

Thus, a need remains in the art for an improved vehicle ramp that is inexpensive to manufacture, compact to ship and store, relatively lightweight, and that can be easily assembled or repaired without the need for specialized tools or undue labor.

BRIEF SUMMARY OF THE INVENTION

The present invention is directed to a vehicle ramp comprising two outer side rails, a plurality of rungs configured to extend between the side rails, and at least one connecting member configured to releasably secure the side rails in place with the rungs there between. A plurality of slots in each side rail are configured to receive opposing ends of a rung and to hold the same in place when the side rails are secured together by the connecting member. A manufacturer or user can easily assemble the vehicle ramp by inserting the rungs into the slots in the side rails and fastening the connecting member(s) to the side rails so as to hold the side rails in place, all without the use of welding or specialized equipment or tools. Likewise, the vehicle ramp may be inexpensively and easily disassembled for compact shipping or storage, and may also be easily disassembled to replace or repair individual components, by disconnecting the connecting member(s) from the side rails and removing the rungs from the slots.

In a preferred embodiment, each of the slots is configured to mateably receive the rung, such that the rung is secured from movement in all directions except the direction from which it was inserted into the slot. Preferably, the slot is configured such the rung must be inserted and withdrawn from the "inboard" side of the side rail in a direction generally parallel the longitudinal axis of the rung. Once the rungs are inserted into the slots of the first side rail, the opposite ends of the rungs are inserted into corresponding slots in the second side rail. The side rails are then secured in position by the connecting members. Once the side rails are secured together, the rungs are fixed in position and cannot be removed.

In the most preferred embodiment, at least one of the connecting members is configured as a ramp hook, capable of attaching one end of the ramp to a transport vehicle. In addition, it is preferred that one connecting member extends between and is removably secured to the top ends of the side rails, and a second connecting member extends between and is removably secured to the bottom ends of the side rails. The top and bottom ends of the side rails may each include an end cap, wherein the connecting members are secured to the end caps via removable fasteners such as screws, bolts, or lock pins. Alternatively, the connecting members may be secured to the side rails using side plates attached to the side rails via removable fasteners such as screws, bolts, or lock pins.

The side rails, rungs, and connecting members are preferably made from a lightweight, rigid material so as to provide strength without excess weight. Most preferably, the ramp components are formed of extruded aluminum.

BRIEF DESCRIPTION OF THE DRAWINGS

FIG. 1 is a perspective view of an assembled vehicle ramp in accordance with a preferred embodiment of the present invention wherein the vehicle ramp comprises two side rails, a plurality of rungs, and two connecting members configured as ramp hooks.

FIG. 2 is a cross-sectional view of a side rail of FIG. 1 taken along line 2-2 of FIG. 1.

FIG. 3 is a fragmented perspective view of the ramp of FIG. 1 showing a portion of a side rail and three rungs inserted into slots in the side rail.

FIG. 4 is a fragmented exploded view of the ramp of FIG. 1 showing the end of a rung inserted into a slot of a side rail.

FIG. 5 is a fragmented perspective view of a side rail of FIG. 1 without the rungs inserted therein.

DETAILED DESCRIPTION OF PREFERRED EMBODIMENT

Figure 6:
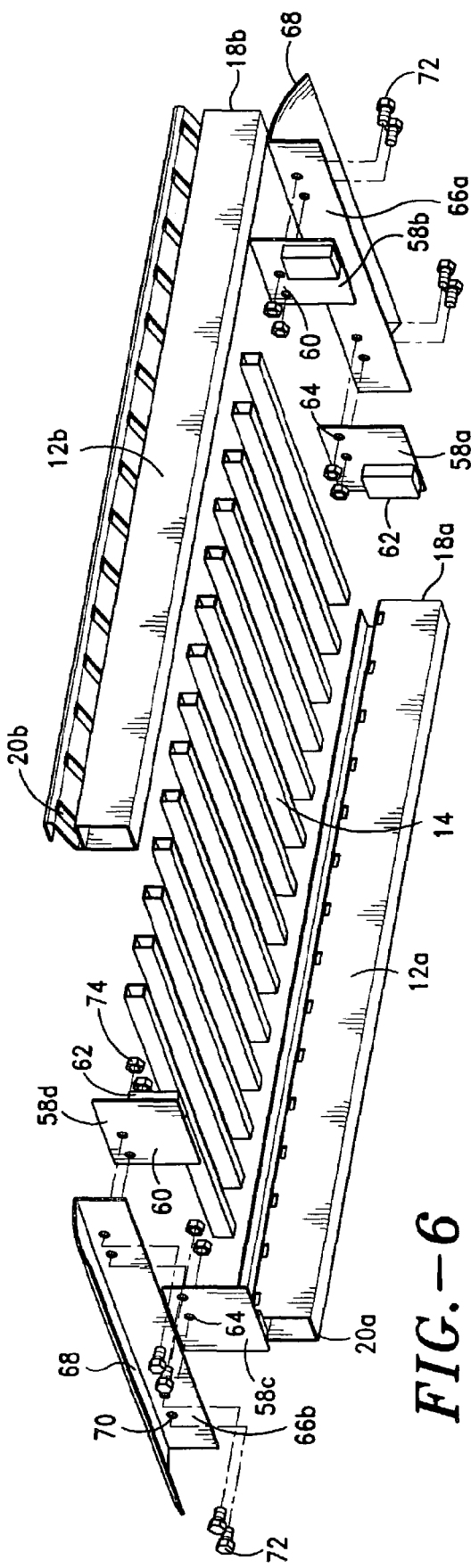
FIG. 6 is an exploded view of the ramp of FIG. 1 showing the underside of the assembled ramp.

The present invention is directed to a ramp that is easily and inexpensively manufactured and assembled, lightweight, compactly storable, and easily repairable. While this invention is directed to a ramp that may be used for loading and unloading any type of equipment or materials, it is preferably used for loading and unloading vehicles such as automobiles, all-terrain vehicles ("ATVs"), dune buggies, motorcycles, tractors, lawn mowers and wheelchairs. The ramp of the present invention is particularly well adapted for use with all-terrain vehicles ("ATVs"). Typically, a pair of ramps will be used for loading and unloading the vehicle wherein each ramp is used to support movement of the wheels on one side of the vehicle.

Referring initially to FIG. 1, a vehicle ramp in accordance with a preferred embodiment of the present invention is designated generally by the numeral 10. Ramp 10 has two side rails 12a, 12b extending parallel one another; a plurality of rungs 14 extending perpendicular to and between the side rails; and two connecting members 16a, 16b extending between and removably attached to the top ends 18a, 18b and bottom ends 20a, 20b respectively of the side rails.

Turning now to FIGS. 2 and 5, each side rail 12 has a support base 26 for supporting the bottom surfaces of the rungs, and a track 28 for securing the rungs in position. Support base 26 is a rectangular tube having an inboard surface 30, an outboard surface 32, an upper surface 34, and a lower surface 36. Track 28 has a front wall 38 extending upward from upper surface 34 parallel inboard surface 30 of the support base. A connecting wall 40 extends at an angle upward from front wall 38 to a back wall 42, which back wall 42 extends parallel outboard surface 32 of the support base. A top wall 44 extends inboard from back wall 42 parallel upper surface 34 of the support base.

Each side rail 12 includes a plurality of slots 46 defined by apertures formed through front wall 38 and connecting wall 40 of track 28. Slots 40 are each configured to mateably receive an end of a rung 14. As illustrated in FIGS. 1, 3 and 4, each rung 14 comprises a square tube having first and second ends 48a, 48b; an upper face 52; a lower face 54; and two side faces 56a, 56b. When end 48 of the rung is inserted into slot 46, lower face 54 is in abutting engagement with upper surface 34 of the support base; upper face 52 is in abutting engagement with top wall 44 of the track; end 48 is in abutting engagement with back wall 42 of the track; and side faces 56a, 56b are in abutting engagement with the edges of connecting wall 40 and front wall 38 on opposing sides of slot 46. Thus, when the rung is inserted into the slot every face of the rung is in abutting engagement with a surface of the side rail such that the side rail prevents movement of the rung in any direction other than the direction in which the rung was inserted, namely from the inboard side of the side rail (facing the other side rail) parallel the longitudinal axis of the rung.

In order to assemble the ramp, the first end 48a of each rung is inserted into one of the slots 46 of side rail 12a. The second side rail 12b is then fitted over the second ends 48b of the rungs by fitting each second end 48b into a corresponding slot in the second side rail.

Support base 26 and track 28 may have other configurations. For example, the cross sectional shape of support base 26 need not be rectangular, but may be square, trapezoidal, circular, or any other shape, provided it provides an upper surface that can serve to abuttingly engage a portion of the rungs. Furthermore, the base could be a solid strip of material as opposed to a tube, so long as it provides adequate support to the rungs under the weight of anticipated loads. Likewise, the track and associated slots may be configured in a variety of different shapes, so long as the track is capable of receiving the rungs and preventing movement of the rungs when the side rails are secured together. For example, the track could employ right angles or other angles at each of the wall junctions, or the front wall could be eliminated so that the connecting wall directly connects to the support base. Likewise, the rungs need not be square and need not be tubular in form. The rungs may alternatively be rectangular or cylindrical or may be formed of a solid material. Furthermore, the rungs are not required to have a uniform configuration. For example, the rungs may have smaller ends and wider centers, so long as the ends of the rungs can be mateably received within the slots of the side rail and support the anticipated load.

Once the rungs and the side rails are fitted together, connecting members 16a, 16b are secured to top ends 18a, 18b and bottom ends 20a, 20b of the side rails respectively so as to secure the side rails in position with the rungs therebetween.

Figure 7:
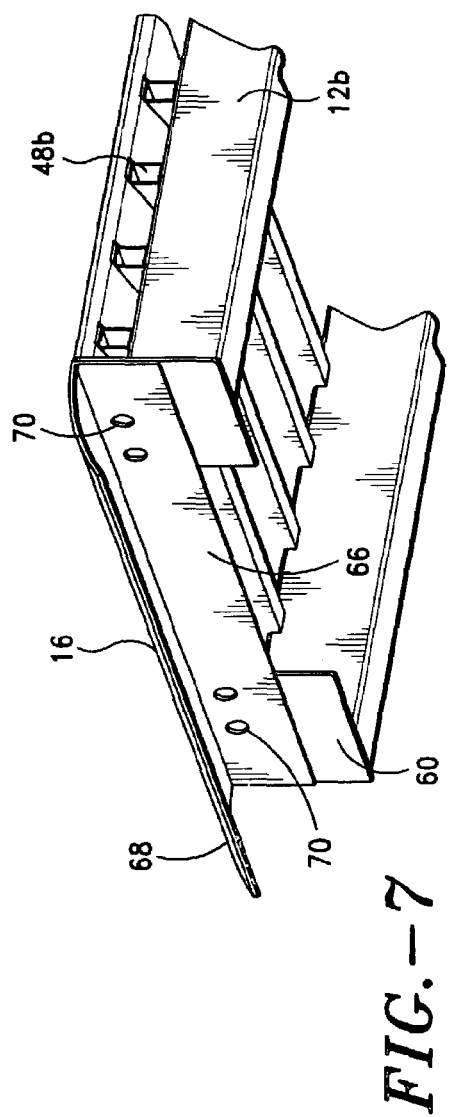
FIG. 7 is a fragmented perspective view of the ramp of FIG. 1 showing the underside of one end of the assembled ramp.

In the preferred embodiment shown in FIGS. 6 and 7, end caps 58a, 58b, 58c, 58d are secured over ends 18a, 18b, 20a, 20b of the side rails respectively. End caps 58 each include a substantially planar outer cover plate 60, and an insert 62 extending into the interior of the tubular slide rail 12. Insert 62 is configured to be press fit into the end of the side rail and may be additionally secured to the side rail using glues, adhesives, welding, screws or other means known in the art. Cover plate 60 includes a pair of apertures 64 for receiving a releasable fastener such as a screw, bolt or lock pin.

Connecting members 16 each comprise a planar face plate 66 configured to extend between the outboard edge of each side rail the width of the ramp, and a ramp hook 68 extending outward from the top edge of face plate 66. Face plate 66 includes a pair of apertures 70 at either end aligned with corresponding apertures 64 in cover plate 60. In the embodiment shown in the drawings, face plate 66a, 66b is secured to ends 18a, 18b, 20a, 20b respectively by inserting bolts 72 through apertures 64, 70 and securing the same with nuts 74.

Figure 8:
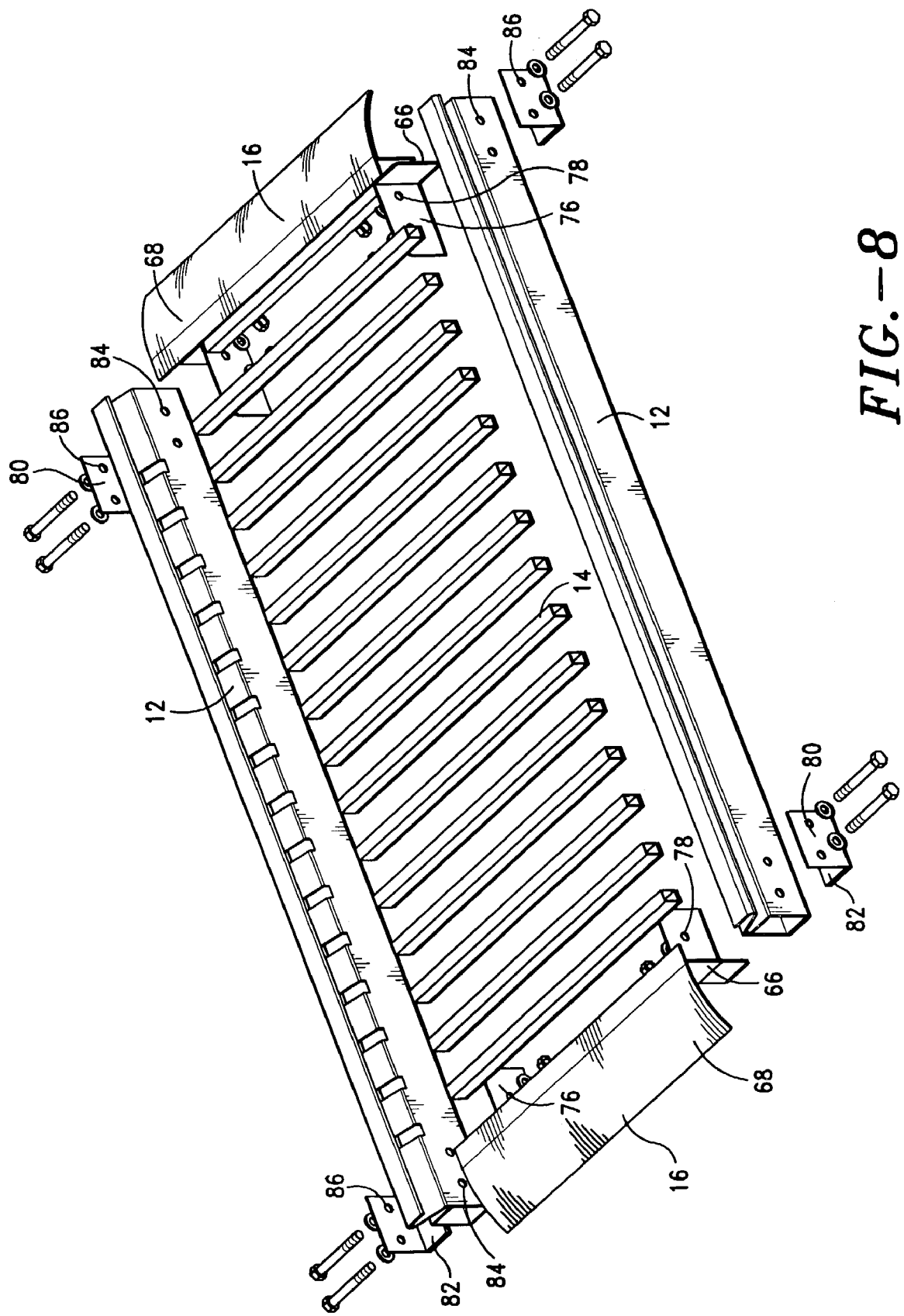
FIG. 8 is an exploded view of an assembled vehicle ramp in accordance with an alternative preferred embodiment of the present invention wherein the vehicle ramp comprises two side rails, a plurality of rungs and two connecting members configured as ramp hooks.

In the alternative preferred embodiment shown in FIG. 8, the ramp does not include end caps 58 to secure connecting members 16 to side rails 12. Instead, connecting members 16 each comprise a planar face plate 66 configured to extend between the outboard edge of each side rail the width of the ramp, a ramp hook 68 extending outward from the top edge of face plate 66, and an inner plate 76 extending inward toward the ramp from the rear surface of face plate 66. Inner plate 76 is positioned such that the inboard surface of a respective side rail 12 rests against the outer surface of the inner plate. Inner plate 76 includes two apertures 78 for receiving a releasable fastener such as a screw, bolt or lock pin. Outer plate 80 is positioned against the outboard side of a respective side rail 12 and includes a bottom ledge 82 configured to rest in abutting engagement with bottom wall 36 of side wall 12. Apertures 86 where in appetures 78, 84 and 86 are aligned such that outer plate 80, side rail 12 and inner plate 76 may be releasably secured together by inserting bolts 88 therethrough.

The side rails 12, rungs 14, and connecting members 16 can be made from any substantially rigid and strong material, such as metal, wood, plastic, composite material or combinations thereof. The ramp components are preferably made of metal and most preferably made of extruded aluminum alloy. While the rungs may be made of solid material, they are preferably formed of tubular aluminum alloy so as to be lighter in weight yet sufficiently strong to support the anticipated load of an ATV or other small vehicle. The dimensions of the ramp components may vary depending upon the intended use. In the most preferred embodiment for use in loading and unloading ATV's and other small vehicles, the length of the ramp ranges from 2 to 4 feet and the width of the ramp ranges from 1 to 2 feet.

Since many possible embodiments may be made of the invention without departing from the scope thereof, it is to be understood that all matters herein set forth or shown in the accompanying drawings are to be interpreted as illustrative, and not in a limiting sense.

In the most preferred embodiment shown in FIGS. 1-7, the ramp is configured using side rails, rungs, and connecting members of a specific configuration. It should be understood that while the drawings depict a specific configuration, a variety of different configurations for each component are known in the art and considered suitable for purposes of this invention.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A ramp comprising:
   first and second side rails extending parallel to each other, each side rail having at least one slot;
   at least one rung extending from a first end to a second end, wherein the first end of said rung is received within one of said slots in said first side rail and the second end of said rung is received within a corresponding one of said slots in said second side rail, wherein said slots are configured to prevent movement of the rung when the side rails are secured together with said rung therebetween such that said rung is not otherwise secured to said side rails;
   at least one connecting member extending between and releasably secured to said first and second side rails whereby said connecting member secures said side rails together with said rung captured therebetween such that said rung is not otherwise secured to said side rails; and
   end caps secured over a top and bottom end of each side rail.

* * * * *